United States Patent
Saigusa et al.

(10) Patent No.: US 7,289,146 B2
(45) Date of Patent: Oct. 30, 2007

(54) SOLID STATE IMAGE PICKUP DEVICE

(75) Inventors: Akio Saigusa, Tochigi (JP); Satoshi Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 10/766,461

(22) Filed: Jan. 27, 2004

(65) Prior Publication Data

US 2004/0246858 A1 Dec. 9, 2004

(30) Foreign Application Priority Data

Jun. 3, 2003 (JP) ............................. 2003-157516

(51) Int. Cl.
*H04N 9/64* (2006.01)
(52) U.S. Cl. ........................ 348/248; 348/250
(58) Field of Classification Search ................ 348/248, 348/249, 250, 222.1, 241, 297, 298
See application file for complete search history.

(56) References Cited

U.S. PATENT DOCUMENTS 6,798,450 B2 * 9/2004 Baer ........................... 348/248

FOREIGN PATENT DOCUMENTS

JP 2000-50165 2/2000

* cited by examiner

*Primary Examiner*—Tuan Ho
*Assistant Examiner*—Asif Khokhar
(74) *Attorney, Agent, or Firm*—Morgan & Finnegan, LLP (57) ABSTRACT

In an image reading apparatus using a solid state image pickup element, a smear amount and the total received light amount at whole image taking region of the CCD linear sensor when a light source is turned on without film, are measured and calculated.

Using a ratio of the total received light amount when a light source is turned on without film to the one at the time of image reading, a smear correction data of each line is calculated for correction processing.

24 Claims, 6 Drawing Sheets

CCD READING DIRECTION (MAIN SCANNING DIRECTION)

SCANNING DIRECTION (SUB-SCANNING DIRECTION)

SOLID STATE IMAGE PICKUP DEVICE

BACKGROUND OF THE INVENTION

1. Field of the Invention

The present invention relates to a solid state image pickup device that optically reads an image and converts the image into digital data.

2. Related Background Art

Up to now, a large number of image reading apparatuses have been developed. Even in medical fields, in order to conduct electronic filing, remote diagnosis, a diagnostic support using a computer, and the like, there have been developed apparatuses that take a medical image, in particular, an X-ray film image and convert the medical image into digital data.

According to such image reading apparatuses, an X-ray film is irradiated with light from a light source such as a halogen lamp or a fluorescent lamp and light transmitting through the X-ray film is received by a solid-state image pickup element such as a CCD linear sensor. Then, the X-ray film is scanned to obtain image data.

With respect to a CCD used as the solid-state image pickup element, there is a case where a phenomenon which is called a smear, in which a photoelectric conversion output levels rise by leaking a charge generated in a photoelectric conversion unit or a part of incident light to a transferring unit, occurs. The smear is caused when intense light is entered into the CCD linear sensor. When the smear is caused, the photoelectric conversion output levels of all reading pixels on the transferring unit rise.

Figure 5:
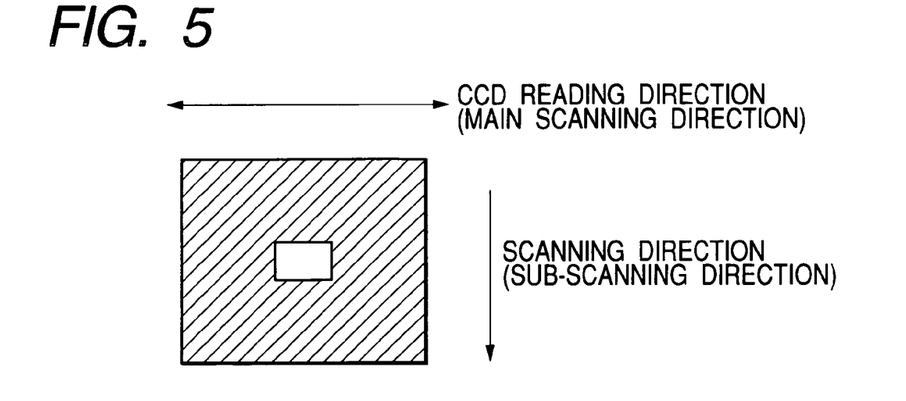
FIG. 5 is an explanatory view showing a film in which a low density region is present in a high density region.
Figure 6:
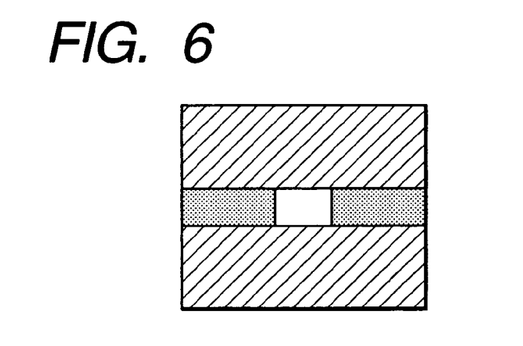
FIG. 6 in an explanatory view showing signal levels in the case where the film is read.

For example, in the case where a film in which a low density region is present in a high density region as shown in FIG. 5 is scanned for reading in the illustrated scanning direction, the smear is caused from the light entered into the low density region. Therefore, as shown in FIG. 6, such a problem is caused that levels of right and left regions adjacent to the low density region vary is caused.

Up to now, in order to reduce the smear, a mask is provided on a chip of the solid-state image pickup element to prevent a part of incident light from leaking to the transferring unit. Alternatively, for example, the photoelectric conversion unit may be separated from the transferring unit to prevent a charge generated in the photoelectric conversion unit from leaking to the transferring unit.

Figure 7:
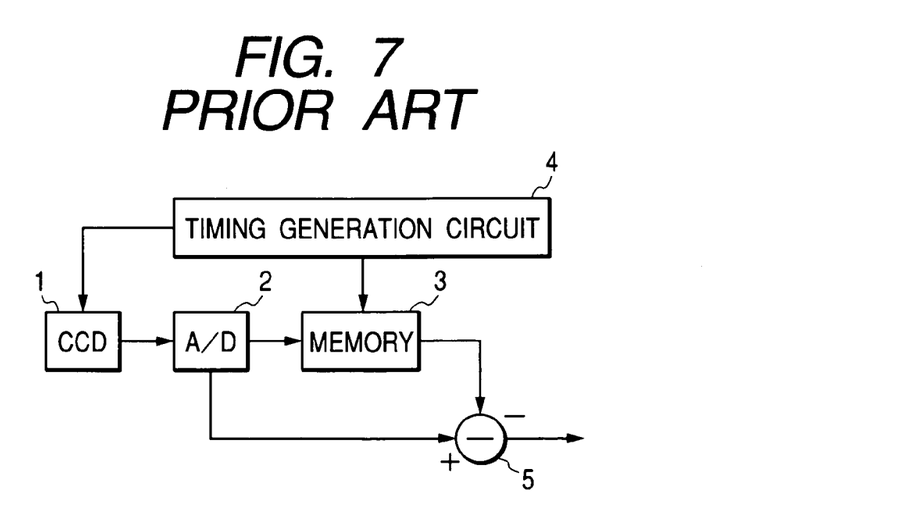
FIG. 7 is a structural diagram showing a smear correction circuit of a conventional example.

Also, there is a method of electrically conducting a smear correction using the output of the solid-state image pickup element. FIG. 7 shows a smear correction circuit for removing the smear, which is provided in an image reading apparatus. The smear correction circuit includes a solid-state image pickup element 1 made from a CCD, an A/D converter 2, a memory 3, a timing generation circuit 4, and a subtracter 5.

The memory 3 temporarily stores a pixel signal A/D-converted by the A/D converter 2. When a record signal is provided, an input signal is written. The written signal is held and outputted. The timing generation circuit 4 controls drive timing of the solid-state image pickup element 1 and write timing to the memory 3. The subtracter 5 subtracts the signal outputted from the memory 3 from the pixel signal outputted from the A/D converter 2.

Figure 8:
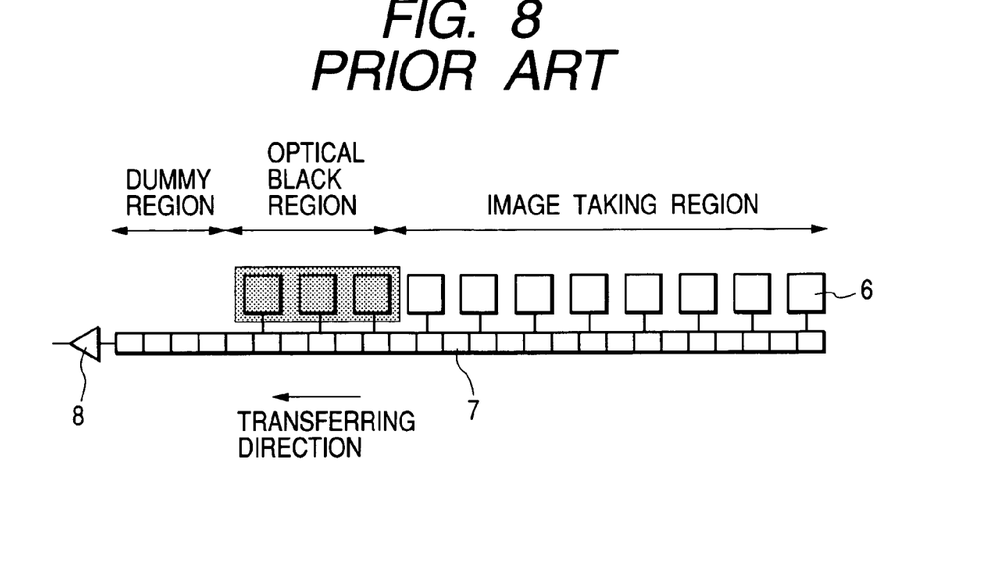
FIG. 8 is a structural diagram showing a solid-state image pickup element of the conventional example.

As shown in FIG. 8, the solid-state image pickup element 1 is composed of photoelectric conversion elements 6, transferring registers 7 that transfer charges generated in the photoelectric conversion elements 6, and an amplifier 8 that amplifies the transferred charges to be converted into voltage values. The solid-state image pickup element 1 has an image taking region that receives light transmitting through a film, an optical black region that shields a part of the photoelectric conversion elements 6, and a dummy region in which the photoelectric conversion elements 6 do not exist.

First, when the light transmitting through the film is imaged onto the solid-state image pickup element 1, charges generated in the photoelectric conversion elements 6 are read to the transferring registers 7 and then transferred in the transferring direction indicated by an arrow. The charges transferred by the transferring registers 7 are amplified by the amplifier 8 and outputted as voltage values in succession. When such operation is repeated while the film is scanned, image signals of the entire film can be obtained.

When intense light is entered into the solid-state image pickup element 1, an output voltage of the solid-state image pickup element 1 increases by a constant level by the influence of the smear. However, because the charges produced from the light entered into the solid-state image pickup element 1 are not present in pixels within the dummy region, only smear components produce. Therefore, the signals from the pixels within the dummy region are subtracted from the signals from the pixels within the image taking region, so that pixel signals from which the smear components are removed can be obtained.

Figure 9:
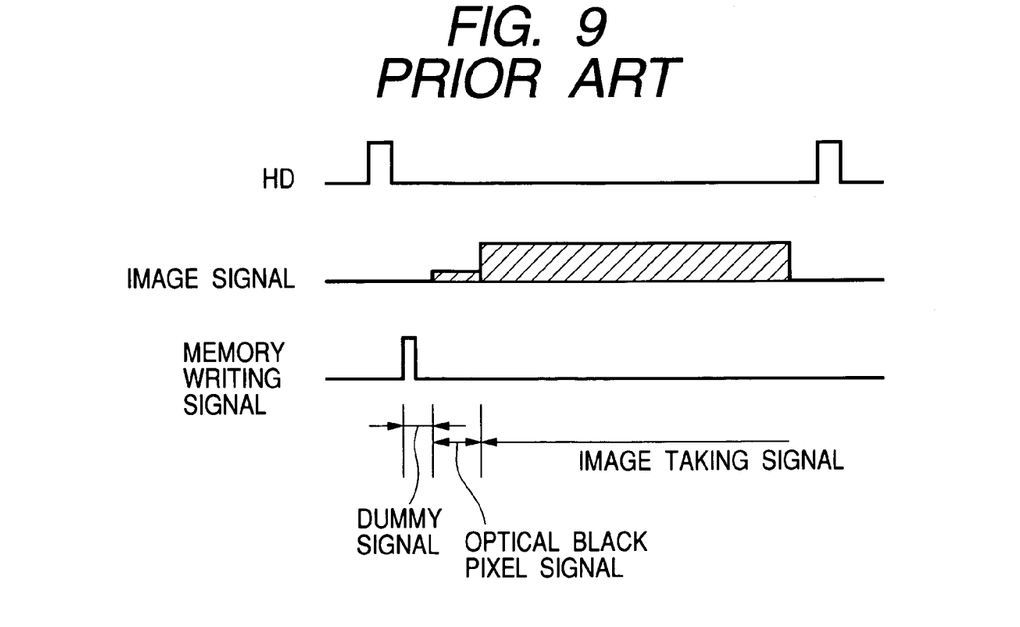
FIG. 9 is a timing chart showing reading operation of the smear correction circuit of the conventional example.

FIG. 9 is a timing chart showing the operation of the smear correction circuit in the image reading apparatus as shown in FIG. 7. As shown in FIG. 9, a pixel signal is outputted from the solid-state image pickup element 1 in synchronization with a horizontal synchronizing signal HD. In addition, as shown in FIG. 9, data is written into the memory 3 for only a period corresponding to the dummy region of the solid-state image pickup element 1. A dummy signal written into the memory 3 is outputted to the subtracter 5 without processing and subtracted from the pixel signal from the image taking region by the subtracter 5. Thus, according to such operation, a pixel signal from which the smear component is removed can be obtained.

According to Japanese Patent Application Laid-Open No. 2000-050165, a method is disclosed, in which an addition average output of a plurality of dummy pixels in which no photoelectric conversion elements are provided or an addition average output of optical black pixels is held in a memory, and a signal (dummy pixel signal or optical black pixel signal) which is held in the memory is subtracted from a pixel signal from a solid-state image pickup element to remove a smear.

However, according to the above-mentioned conventional examples, it is necessary to provide a mask on a chip of the solid-state image pickup element. In the method in which the photoelectric conversion unit is separated from the transferring unit, it is difficult to completely remove the smear. In addition to this, a process for setting the mask is required and the size of the chip increases. Thus, there is a defect that a cost of the solid-state image pickup element increases.

In the method in which the dummy pixel signal or the optical black pixel signal is subtracted from the pixel signal from the solid-state image pickup element, the number of dummy pixel signal and the number of optical black pixel signal are limited to a range of from several pixels to several tens of pixels. Therefore, even if the addition average output is used, there is a problem in that the influences of noises such as a dark current and a random noise, other than the smear, cannot be completely eliminated to cause streak-shaped noises on an image.

SUMMARY OF THE INVENTION

An object of the present invention is to solve the above-mentioned problems and to provide a solid state image pickup device in which the smear correction can be accurately performed even in the case where the smear is caused in the solid state image pickup element.

To achieve the above-mentioned object, a solid state image pickup device according to the present invention is characterized by including:

solid state image pickup means for optically reading an image and converting the image into an electrical image signal;

memory means for storing a smear reference amount of the solid state image pickup means;

first calculation means for calculating a physical amount proportional to a received light amount of the solid state image pickup means based on an output of the electrical image signal from the solid state image pickup means, second calculation means for calculating smear correction data based on outputs of the first calculation means and the memory means, and correction means for correcting an image signal obtained through reading the image by the image pickup means using the smear correction data.

Further object and structure according to the present invention will be clear by the description of the embodiments described hereinbelow.

DESCRIPTION OF THE PREFERRED EMBODIMENTS

Hereinafter, the present invention will be described in detail with reference to an embodiment shown in FIGS. 1 to 4.

Figure 1:
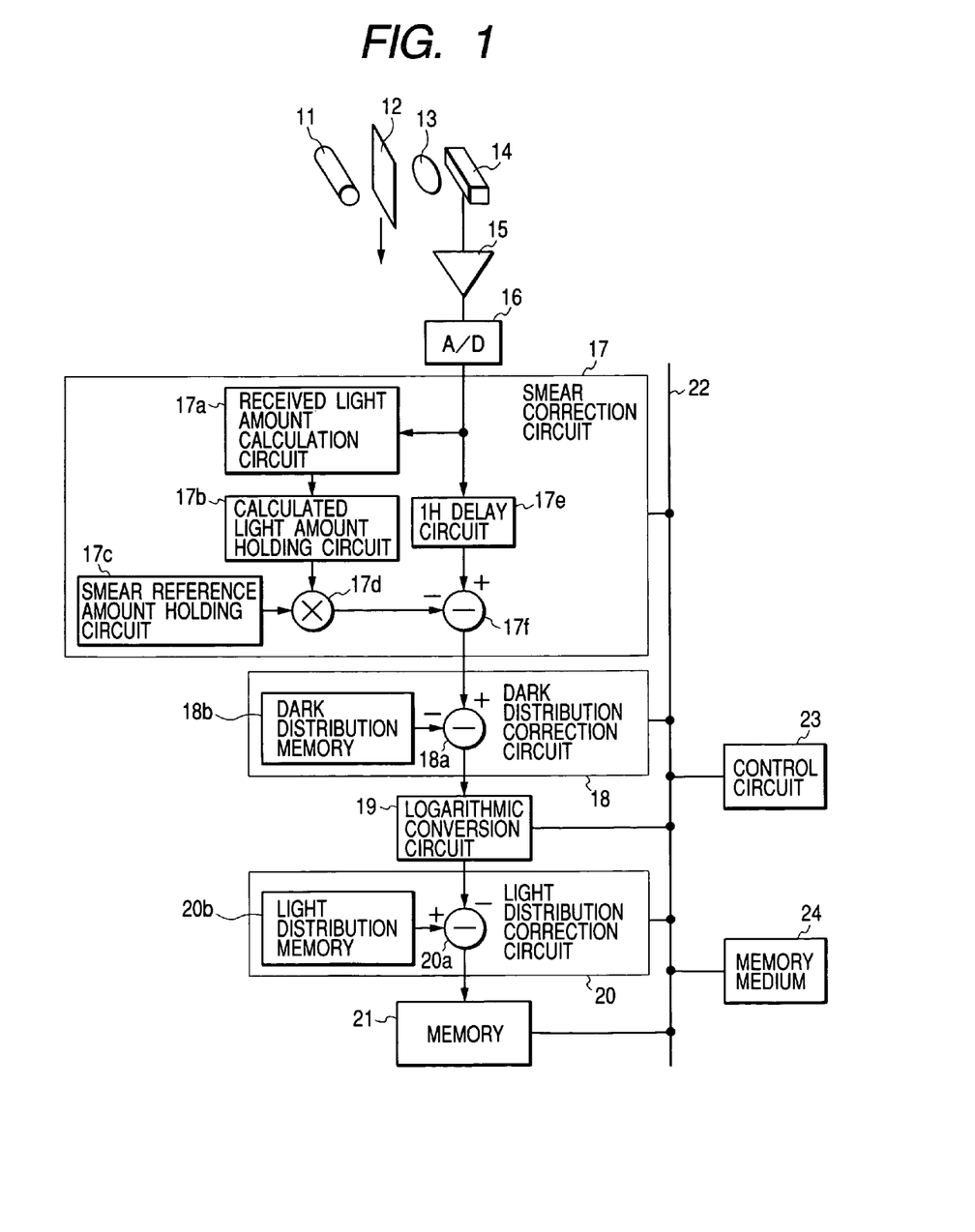
FIG. 1 is a structural diagram showing a shading correction circuit according to an embodiment of the present invention.

FIG. 1 is a structural diagram showing a shading correction circuit of an X-ray film image reading apparatus according to an embodiment of the present invention. According to the X-ray film image reading apparatus, an X-ray film 12 serving as a read object, an optical system lens 13, and a CCD linear sensor 14 are located in order in front of a light source 11 made from a fluorescent lamp, a halogen lamp, or the like. An output of the CCD linear sensor 14 is connected with an A/D converter 16 through an amplifier 15. An output of the A/D converter 16 is successively passed to a smear correction circuit 17, a dark distribution correction circuit 18, a logarithmic conversion look-up table 19, a light distribution correction circuit 20, and a memory 21 that stores data acquired by the shading correction.

The smear correction circuit 17, the dark distribution correction circuit 18, the logarithmic conversion look-up table 19, the light distribution correction circuit 20, and the memory 21 are connected with a control circuit 23 and a recording medium 24 such as a RAM, ROM, HD, or the like through a bus line 22 for transferring addresses, data, control signals, and the like. The control circuit 23 is composed of a CPU and the like. The recording medium 24 stores, for example, a program for operating the X-ray film image reading apparatus.

The smear correction circuit 17 includes a received light amount calculation circuit 17a, a calculated light amount holding circuit 17b, a smear reference amount holding circuit 17c, a multiplier 17d, a 1H delay circuit 17e capable of storing pixel data corresponding to one line of the CCD linear sensor 14, and a subtracter 17f.

The dark distribution correction circuit 18 includes a subtracter 18a and a dark distribution memory 18b having a capacity equal to the number of pixels of the CCD linear sensor 14. The light distribution correction circuit 20 includes a subtracter 20a and a light distribution memory 20b having the capacity equal to the number of pixels of the CCD linear sensor 14.

Figure 2:
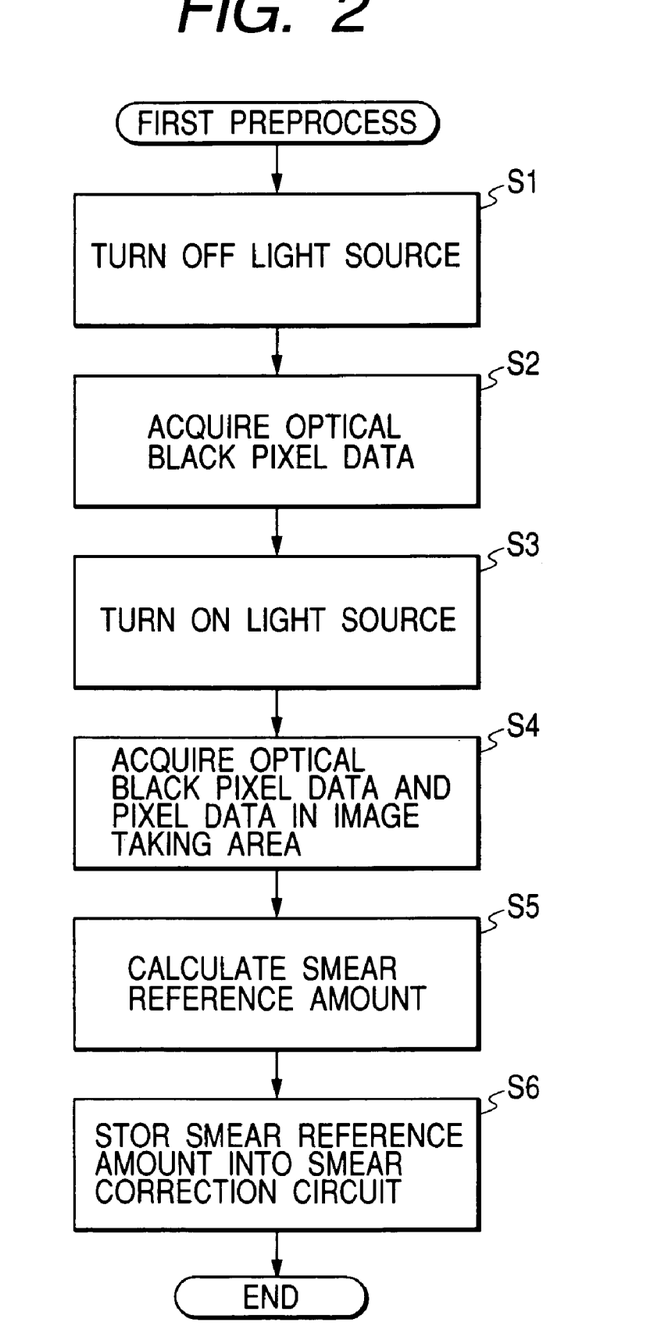
FIG. 2 is a flow chart showing a first preprocess.
Figure 3:
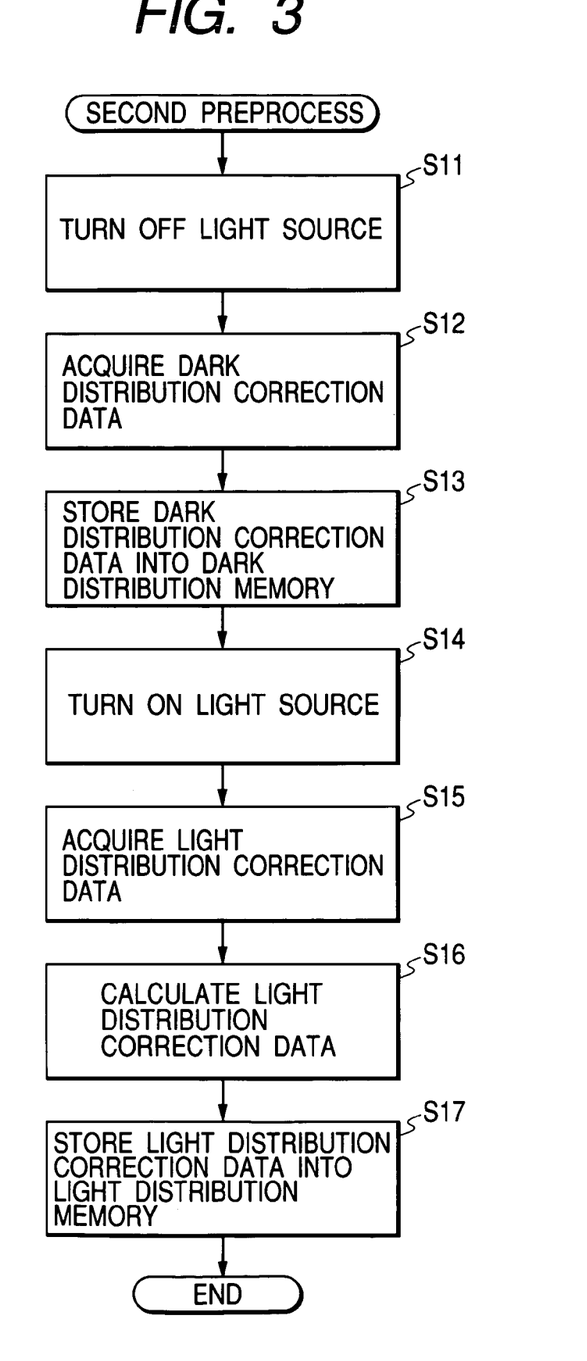
FIG. 3 is a flow chart showing a second preprocess.
Figure 4:
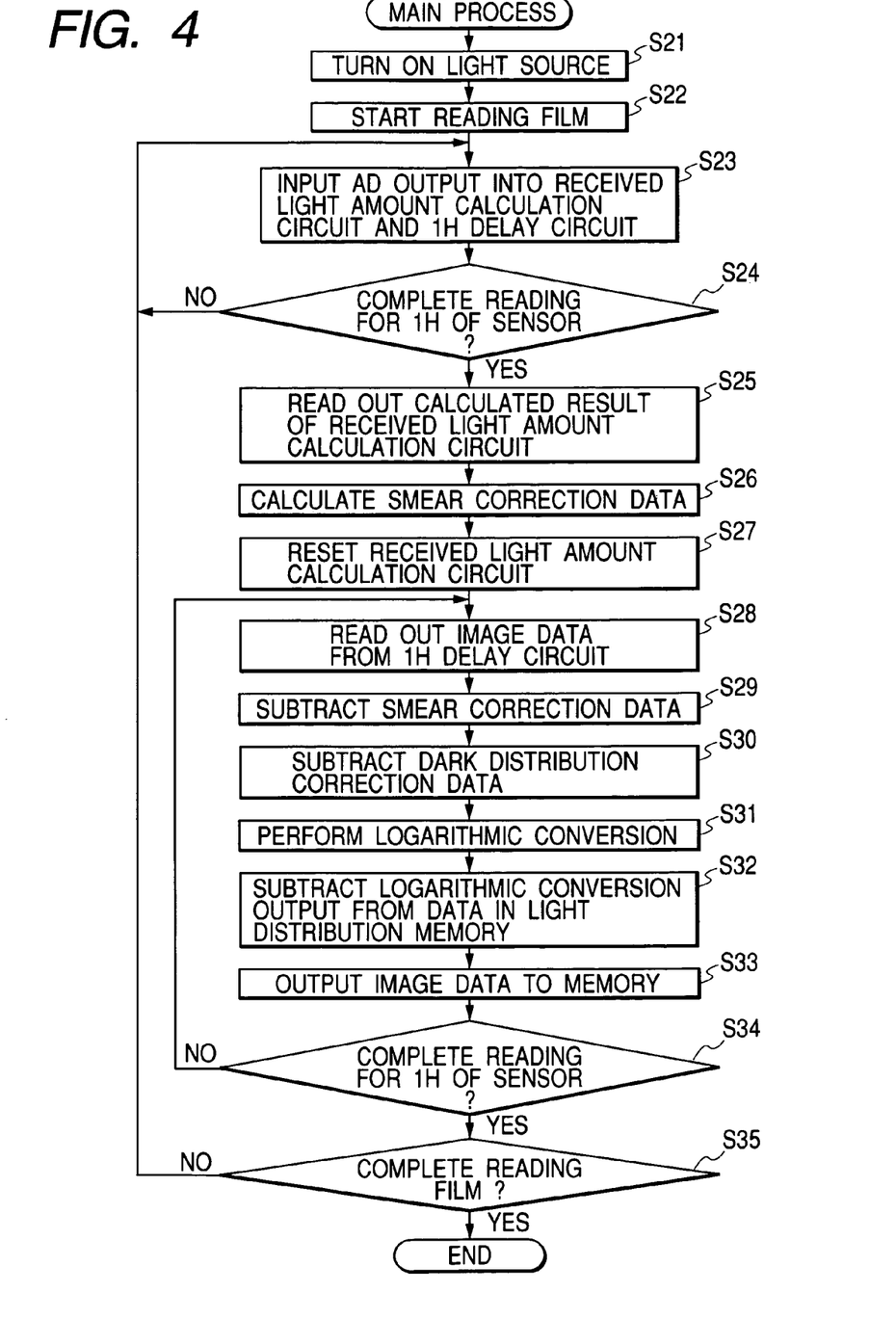
FIG. 4 is a flow chart showing a main process.

The shading correction process includes a first preprocess shown in the flow chart of FIG. 2, a second preprocess shown in the flow chart of FIG. 3, and a main process shown in the flow chart of FIG. 4. In the first preprocess, the acquisition, the calculation, and the storage of smear reference data for smear correction, and the storage of data into the smear reference amount holding circuit 17c are performed. In the second preprocess, the acquisition, the calculation, and the storage of data for correcting a dark distribution and a light distribution, and the storage of data into the dark distribution memory 18b and light distribution memory 20b are performed. In the main process, the X-ray film 12 serving as the read object is read and an actual correction process is performed using the data stored in the first preprocess and the second preprocess.

First, according to the first preprocess performed before the reading of the X-ray film 12, in Step S1 shown in FIG. 2, the light source 11 is turned off by a lighting control circuit (not shown). Then, in Step S2, optical black pixel data at the dark state is acquired from the output of the CCD linear sensor 14. Subsequently, in Step S3, the light source 11 is turned on. In Step S4, optical black pixel data at the light state and pixel data in the image taking area at the light state are acquired from the output of the CCD linear sensor 14.

Subsequently, in Step S5, a smear reference amount is calculated from the optical black pixel data acquired in Step S2 and Step S4. Then, in Step S6, the smear reference amount calculated in Step S5 is stored in the smear reference amount holding circuit 17c of the smear correction circuit 17.

According to the second preprocess, first, in Step S11, the light source 11 is turned off by the lighting control circuit. Then, in Step S12, pixel data in the image taking region at the dark state is acquired as dark distribution correction data from the output of the CCD linear sensor 14. In Step S13, the dark distribution correction data acquired in Step S12 is stored in the dark distribution memory 18b. In Step S14, the light source 11 is turned on by the lighting control circuit. Then, in Step S15, pixel data in the image taking region at the light state are acquired from the output of the CCD linear sensor 14. Subsequently, in Step S16, light distribution correction data is calculated from the data acquired in Step S15. In Step S17, the light distribution correction data calculated in Step S16 is stored in the light distribution memory 20b. Note that the second preprocess is not necessarily performed every time the X-ray film 12 is read and may be performed only when a light amount of the light source 11 changes.

Next, according to the main process in which the X-ray film 12 is actually read, first, in Step S21 shown in FIG. 4, the light source 11 is turned on. Then, in Step S22, the X-ray film 12 is transported by a transporting unit (not shown) and film reading starts. In Step S23, an A/D output of the CCD linear sensor 14 is inputted to the received light amount calculation circuit 17a and the 1H delay circuit 17e in the smear correction circuit 17.

In Step S24, it is determined whether or not reading for one line of the CCD linear sensor 14 is completed. Processing of Step S23 is repeated until reading for one line is completed. In Step S25, a calculated result of received light amount is read out from the received light amount calculation circuit 17a and stored in the calculated light amount holding circuit 17b. In step S26, smear correction data is calculated using the calculated result of received light amount stored in Step S25 and the smear reference amount calculated in Step S6 in the first preprocess.

Subsequently, in Step S27, the received light amount calculation circuit 17a is reset in order to calculate a received light amount for a next line. In Step S28, image data is read out from the 1H delay circuit 17e. In Step S29, the image data read out in Step S28 is corrected using the smear correction data calculated in Step S26 by subtraction.

Subsequently, in Step S30, the dark distribution correction data stored in Step S13 in the second preprocess is subtracted from the image data acquired by the smear correction in Step S29. In Step S31, the logarithmic conversion is performed on the image data acquired by the dark distribution correction in Step S30 using the logarithmic conversion look-up table 19. In Step S32, the image data acquired by the logarithmic conversion in Step S31 is subtracted from the light distribution correction data stored in Step S17 in the second preprocess.

In Step S33, the image data acquired by the light distribution correction in Step S32 is stored in the memory 21. Then, in Step S34, it is determined whether or not reading for one line data inputted to the 1H delay circuit 17e is completed. Processing of Step S28 to Step S33 is repeated until reading for one line is completed.

In Step S35, it is determined whether or not reading for the X-ray film 12 is completed. Processing of Step S23 to Step S34 is repeated until reading is completed, thereby acquiring an X-ray film image. Note that, if the processing of Step S23 and the processing of S28 to S34 are conducted at the same time, a processing time can be shortened.

With respect to the first preprocess performed before the X-ray film 12 is read, an example of a method using an output value from an optical black pixel will be described as the method of calculating the smear reference amount. Next, an example of a method of calculating a sum of pixel outputs of the image taking region will be described as a method of calculating a physical amount proportional to the received light amount.

When the light source 11 is turned off, the CCD linear sensor 14 outputs optical black pixel outputs and image taking region pixel outputs at the dark state as voltage values. The outputs of the CCD linear sensor 14 are amplified by the amplifier 15, subjected to noise reduction by a noise reduction circuit (correlated double sampling (CDS)) which is not shown, and then inputted to the A/D converter 16. Each voltage is converted into n-bit digital data $Ci$ of the optical black pixel ($1 \leq i \leq q$ where q is the number of optical black pixels) by the A/D converter 16.

The digital data $Ci$ of the optical black pixels are stored in the memory 21 without performing the smear correction, the dark distribution correction, the logarithmic conversion, and the light distribution correction. An average value C is calculated from the digital data $Ci$ of the optical black pixels which are stored in the memory 21 by using the following expression (1). Note that q is the number of optical black pixels.

$$C=(1/N)\Sigma Ci (i=1 \text{ to } N); 1 \leq N \leq q \qquad (1)$$

In the expression (1), the optical black pixel outputs at the dark state are used to calculate the average value C. The image taking region pixel outputs at the dark state may be used instead of the optical black pixel outputs.

Next, when the light source 11 is turned on without locating the X-ray film 12, the CCD linear sensor 14 outputs voltage values indicating a light distribution. The outputs of the CCD linear sensor 14 are amplified by the amplifier 15, subjected to noise reduction by the noise reduction circuit which is not shown, and then inputted to the A/D converter 16. Each voltage is converted into n-bit digital data $Ci'$ of the optical black pixel ($1 \leq i \leq q$ where q is the number of optical black pixels) and n-bit digital data $Li$ of the image taking region pixel ($1 \leq i \leq p$ where p is the number of image taking region pixels) by the A/D converter 16.

As with the above-mentioned acquisition operation of the optical black pixel outputs at the dark state, an average value C' of the optical black pixel outputs at the light state is calculated by using the following expression (2).

$$C'=(1/N)\Sigma Ci'(i=1 \text{ to } N); 1 \leq N \leq q \qquad (2)$$

In the above description, the optical black pixel data $Ci$ and $Ci'$ corresponding to one line are used to calculate the average values C and C'. In order to further improve an S/N, the optical black pixel data $Ci$ and $Ci'$ corresponding to a plurality of lines may be stored for calculation.

A smear amount Smax is calculated by the following expression (3) using the average values C and C' calculated from the expressions (1) and (2).

$$S\max = C' - C \qquad (3)$$

Note that, in this embodiment, the smear amount is calculated from the optical black pixel outputs. However, the present invention is not limited to this method. The smear amount may be calculated from dummy pixel outputs. In this case, an average value of the dummy pixel outputs corresponds to the smear amount.

Next, a sum Lsum is calculated from the digital data $Li$ of the image taking region pixels at the light state by using the following expression (4). Note that p is the number of image taking region pixels.

$$L\text{sum}=\Sigma Li(i=1 \text{ to } P) \qquad (4)$$

In this embodiment, the pixels within the entire image taking region are used as calculation objects. However, a pixel in which light is not entered or an amount of the incident light is small may not be used as a calculation object.

A smear reference amount Sref is calculated by the following expression (5) using the smear amount Smax and the sum Lsum of the image taking region pixels at the light state, which are calculated from the expressions (3) and (4).

$$S\text{ref}=S\max/L\text{sum} \qquad (5)$$

The smear reference amount Sref acquired by the above-mentioned processing is stored in the smear reference amount holding circuit 17c of the smear correction circuit 17. The sum is used as the physical amount proportional to the received light amount. However, the present invention is not limited to the sum. The physical amount proportional to the received light amount, such as an average value may be used. Thus, the first preprocess is completed.

Next, in the second preprocess, when the light source 11 is turned off, the CCD linear sensor 14 outputs optical black pixel outputs and image taking region pixel outputs at the dark state as voltage values. The outputs of the CCD linear sensor 14 are amplified by the amplifier 15, subjected to noise reduction by the noise reduction circuit, and then inputted to the A/D converter 16. Each voltage is converted into n-bit digital data Bi of the image taking region pixel ($1 \leq i \leq p$) by the A/D converter 16.

The converted digital data Bi of the image taking region pixels are stored in the memory 21 without performing the smear correction, the dark distribution correction, the logarithmic conversion, and the light distribution correction. The digital data Bi of the image taking region pixels which are stored in the memory 21 are stored as dark distribution correction data in the dark distribution memory 18b of the dark distribution correction circuit 18.

Also, in order to reduce the influences of a random noise and the like, digital data Bij of the image taking region pixels corresponding to a plurality of lines ($1 \leq i \leq p$ where p is the number of image taking region pixels and $1 \leq j \leq N$ where N is the number of acquisition lines) may be acquired and dark distribution correction data Bi' as an average value with respect to the plurality of lines which is calculated by the following expression (6) may be stored in the dark distribution memory 18b.

$$Bi'=(1/N)\Sigma Bij(j=1 \text{ to } N) \qquad (6)$$

Next, when the light source 11 is turned on without locating the X-ray film 12, the CCD linear sensor 14 outputs voltage values indicating a light distribution. The outputs of the CCD linear sensor 14 are amplified by the amplifier 15, subjected to noise reduction by the noise reduction circuit, and then inputted to the A/D converter 16. Each voltage is converted into n-bit digital data Li of the image taking region pixel ($1 \leq i \leq p$) by the A/D converter 16.

As well as the above-mentioned acquisition operation of the dark distribution correction data, the image taking region pixel output Li at the light state is stored in the memory 21. Light distribution correction data Li" is calculated by the following expression (7) from the image taking region pixel output Li which are stored in the memory 21, the dark distribution correction data Bi, and the smear amount Smax. Note that "A" indicates $(2^n-1)/\log_{10}(2^n)$ $$Li''=[A \cdot \log_{10}\{Li-(Bi+Smax)+1\}](1 \leq i \leq p) \qquad (7)$$

The light distribution correction data Li" acquired by such processing is stored in the light distribution memory 20b of the light distribution correction circuit 20.

Also, in order to reduce the influences of a random noise and the like as with the dark distribution correction data, digital data Lij of the image taking region pixels corresponding to a plurality of lines ($1 \leq i \leq p$ where p is the number of image taking region pixels and $1 \leq j \leq N$ where N is the number of acquisition lines) may be acquired and light distribution correction data L" may be calculated using, for the expression (7), light distribution correction data Li' as an average value with respect to the plurality of lines which is calculated by the following expression (8), instead of the light distribution correction data Li. Thus, the second preprocess is completed.

$$Li'=(1/N)\Sigma Lij(j=1 \text{ to } N) \qquad (8)$$

According to the main process in which the X-ray film 12 is actually read, first, when the light source 11 is turned on, light from the light source 11 transmits through the X-ray film 12, is condensed by the optical system lens 13, and imaged onto the CCD linear sensor 14. Because the X-ray films 12 are successively transported by a transporting unit which is not shown in the transporting direction indicated by an arrow, the CCD linear sensor 14 receives a one-dimensional image in a direction orthogonal to the transporting direction. Each of the X-ray films 12 is scanned by the CCD linear sensor 14 to read the entire image.

The light received by the CCD linear sensor 14 is subjected to photoelectric conversion and outputted as a voltage value for each pixel. The output of the CCD linear sensor 14 is amplified by the amplifier 15, subjected to noise reduction by the noise reduction circuit, and then inputted to the A/D converter 16. The voltage is converted into n-bit digital data Di ($1 \leq i \leq p$) by the A/D converter 16.

In the smear correction circuit 17, The output Di of the CCD linear sensor 14 is inputted to the received light amount calculation circuit 17a and the 1H delay circuit 17e. In the received light amount calculation circuit 17a, a sum Dsum as a physical amount proportional to the received light amount is calculated from the inputted image data by the following expression (9). Note that p is the number of image taking region pixels.

$$D\text{sum}=(1/N)\Sigma Di(i=1 \text{ to } p) \qquad (9)$$

Note that the sum Dsum is used as the physical amount proportional to the received light amount. However, the present invention is not limited to the sum. Therefore, the physical amount proportional to the received light amount, such as an average value may be used.

After the image data corresponding to one line are inputted, the calculated result Dsum of received light amount which is calculated by the received light amount calculation circuit 17a is inputted to the calculated light amount holding circuit 17b and held therein. When the calculated result of received light amount is inputted to the calculated light amount holding circuit 17b, the received light amount calculation circuit 17a is reset for next line calculation.

Next, the smear reference amount Sref outputted from smear reference amount holding circuit 17c and the calculated result Dsum of received light amount outputted from the calculated light amount holding circuit 17b are inputted to the multiplier 17d. Then, the multiplication of the following expression (10) is executed and smear correction data S is outputted as the smear amount.

$$S=D\text{sum} \cdot Sref \qquad (10)$$

By the above-mentioned processing, the smear amount S included in the image data Di inputted to the 1H delay circuit 17e is calculated. The image data Di is read out from the 1H delay circuit 17e using the calculated smear amount S and the subtraction of the following expression (11) is executed to acquire smear corrected data Di'. The data Di' is outputted to the dark distribution correction circuit 18.

$$Di'=Di-S \qquad (11)$$

In the dark distribution correction circuit 18, the dark distribution correction data Bi acquired in advance in the second preprocess is subtracted from each pixel output of the smear correction circuit 17 by the subtracter 18a. In the case where the output of the smear correction circuit 17 is given as Di', the output of the dark distribution correction circuit 18 is acquired by the following expression (12).

$$Di''=Di'-Bi (1 \leq i \leq p) \quad (12)$$

The output of the dark distribution correction circuit 18 is inputted to the logarithmic conversion look-up table 19 for division. The logarithmic conversion look-up table 19 has n-bit inputs and n-bit outputs. In the case where the output of the logarithmic conversion look-up table 19 is given as Yi, the following expression (13) is established. Note that "A" indicates $$(2^n-1)/\log_{10}(2^n).$$

$$Yi = \{A \cdot \log_{10}(Di''+1)\} (1 \leq i \leq p) \quad (13)$$

In the light distribution correction circuit 20, the output Yi from the logarithmic conversion look-up table 19 is subtracted by the subtracter 20a from the light distribution correction data Li'' of a corresponding pixel which is stored in advance in the second preprocess. Therefore, the division for calculating the transmittance of the X-ray film 12 is executed by the subtraction of the subtracter 20a. The output of the subtracter 20a becomes a density output because it is a logarithmic value. The density output Zi is acquired by the following expression (14) and stored in the memory 21.

$$Zi = Li'' - Yi (1 \leq i \leq p) \quad (14)$$

After the above-mentioned processing is performed, the image data corresponding to the one line which are held in the 1H delay circuit 17e are read out, the smear correction and the shading correction are performed, and then the next line output of CCD linear sensor 14 is inputted to a received light amount calculation circuit 17a and the 1H delay circuit 17e.

In order to shorten a processing time, the next line writing into the received light amount calculation circuit 17a and the 1H delay circuit 17e may be started at the same time to the readout from the 1H delay circuit 17e. The above-mentioned processing is repeated until the reading to the X-ray film 12 is completed, so that the image data of one X-ray film 12 is acquired. Thus, in the case where the X-ray film 12 is actually read, the smear correction and the shading correction which are described above are performed.

Note that, in this embodiment, the description is made using the CCD linear sensor 14 serving as a monochrome solid-state image pickup element having one-line photoelectric conversion elements. Even in the case of, for example, a color solid-state image pickup element having three-line photoelectric conversion elements for RGB, the above-mentioned processing is performed for each line, so that the smear correction is possible.

Also, in this embodiment, the description is made using the 1H delay circuit 17e. However, a delay time is not necessarily 1H. A delay circuit having 1H or more may be provided. In this case, after the smear reference amount and the image data are stored in the memories, the physical amount proportional to the received light amount may be calculated from the image data to perform the smear correction. For example, in an image reading apparatus in which the shading correction and the like are performed by a connected personal computer (PC), the image data is temporarily sent to the PC and then the physical amount proportional to the received light amount is calculated from the image data, so that the smear correction and the shading correction can be performed.

Also, a CCD linear sensor having plural-line photoelectric conversion elements may be used. In this case, because there is a time difference resulting from gaps among the respective lines, the physical amount proportional to the received light amount outputted from a line that precedes an actual reading line can be calculated for the smear correction. Thus, the smear correction is possible by using a circuit that holds a physical amount proportional to a received light amount to compensate for gaps among the respective lines, instead of using the 1H delay circuit, so that the circuit can be simplified.

According to the embodiment of the present invention, the solid state image pickup device can accurately perform the smear correction without causing streak-shaped noises on an image by the influences of a dark current, a random noise, and the like, other than the smear, by calculating the smear correction data based on the physical amount proportional to the received light amount of the image signal.

A recording medium 24 that stores a program according to the present invention may be supplied to another system or another apparatus. In this case, a computer in the system or the apparatus reads out program codes stored in the recording medium 24 and executes them.

As described above, according to the solid state image pickup device of the present invention, even in the case where the smear is caused in the solid state image pickup element, the smear correction can be accurately performed without causing streak-shaped noises on an image by the influences of a dark current, a random noise, and the like, other than the smear.

What is claimed is:

1. A solid state image pickup device, comprising:
solid state image pickup means for optically reading an image and converting the image into an electrical image signal;
memory means for storing a smear reference amount of the solid state image pickup means; and
calculation means for calculating a physical amount proportional to a received light amount of the solid state image pickup means based on an output of the electrical image signal from the solid state image pickup means,
wherein the electrical image signal is corrected based on the smear reference amount stored in the memory means and an output of the calculation means, and the smear reference amount is acquired by dividing a smear amount by the physical amount proportional to the received light amount when a light source is turned on.

2. A solid state image pickup device according to claim 1, wherein the smear reference amount is acquired by calculating based on a smear amount and the physical amount proportional to the received light amount when a light source is turned on.

3. A solid state image pickup device according to claim 2, wherein the smear amount is a dummy pixel output value when the light source is turned on.

4. A solid state image pickup device according to claim 2, wherein the smear amount is an average value of dummy pixel output values when the light source is turned on.

5. A solid state image pickup device according to claim 2, wherein the smear amount is acquired by subtracting one of an optical black pixel output value and an pixel output value of an image taking region when the light source is turned off, from an optical black pixel output value when the light source is turned on.

6. A solid state image pickup device according to claim 2, wherein the smear amount is acquired by subtracting one of an average value of optical black pixel output values and an average value of pixel output values of the image taking region when the light source is turned off, from an average value of optical black pixel output values when the light source is turned on.

7. A solid state image pickup device according to claim 1, wherein the physical amount proportional to the received light amount is one of a sum and an average value of pixel outputs of the image taking region of the solid state image pickup means.

8. A solid state image pickup device according to claim 1, wherein the solid state image pickup means includes a CCD linear sensor.

9. A solid state image pickup device according to claim 1, wherein the smear amount is a dummy pixel output value when the light source is turned on.

10. A solid state image pickup device according to claim 1, wherein the smear amount is an average value of dummy pixel output values when the light source is turned on.

11. A solid state image pickup device according to claim 1, wherein the smear amount is acquired by subtracting one of an optical black pixel output value and an pixel output value of an image taking region when the light source is turned off, from an optical black pixel output value when the light source is turned on.

12. A solid state image pickup device according to claim 1, wherein the smear amount is acquired by subtracting one of an average value of optical black pixel output values and an average value of pixel output values of the image taking region when the light source is turned off, from an average value of optical black pixel output values when the light source is turned on.

13. A method of correcting a smear of a solid state image pickup device, comprising the steps of:
    storing a smear reference amount of the solid state image pickup means in memory means;
    reading an image signal by a solid state image pickup element;
    calculating a physical amount proportional to an amount of received light of the solid state image pickup means based on an output of the electrical image signal from the solid state image pickup means; and
    correcting the electrical image signal read based on the smear reference amount stored in the memory means and an output based on the calculated result,
    wherein the storing step comprises a step of dividing the smear amount by the physical amount proportional to the received light amount when the light source is turned on.

14. A method of correcting a smear of a solid state image pickup device according to claim 13, wherein the storing step comprises a step of calculating a smear reference amount based on a smear amount and the physical amount proportional to the received light amount when a light source is turned on.

15. A computer readable recording medium storing thereon a computer program to be executed by a computer for performing the procedure of smear correction according to claim 14.

16. A method of correcting a smear of a solid state image pickup device according to claim 13, wherein the reading step comprises a step of calculating one of a sum and an average value of pixel outputs of the image taking region of the solid state image pickup means.

17. A computer readable recording medium storing thereon a computer program to be executed by a computer for performing the procedure of smear correction according to claim 16.

18. A computer readable recording medium storing thereon a computer program to be executed by a computer for performing the procedure of smear correction according to claim 13.

19. A method of correcting a smear of a solid state image pickup device according to claim 13, wherein the storing step comprises a step of subtracting one of an average value of optical black pixel output values and an average value of pixel output values of the image taking region when the light source is turned off, from an average value of optical black pixel output values stored after the light source is turned on.

20. A computer readable recording medium storing thereon a computer program to be executed by a computer for performing the procedure of smear correction according to claim 19.

21. A method of correcting a smear of a solid state image pickup device according to claim 13, wherein the storing step comprises a step of subtracting one of an optical black pixel output value and a pixel output value of the image taking region when the light source is turned off, from an optical black pixel output value when the light source is turned on.

22. A computer readable recording medium storing thereon a computer program to be executed by a computer for performing the procedure of smear correction according to claim 21.

23. A method of correcting a smear of a solid state image pickup device according to claim 13, wherein the storing step comprises a step of calculating an average value of outputs of dummy pixels generated when the light source is turned on.

24. A computer readable recording medium storing thereon a computer program to be executed by a computer for performing the procedure of smear correction according to claim 23.

* * * * *